United States Patent
Lazic et al.

(10) Patent No.: US 9,527,527 B2
(45) Date of Patent: Dec. 27, 2016

(54) METHOD AND SYSTEM FOR INTELLIGENT SCALING OF TORQUE OVERLAY INTERVENTION FOR SEMI-AUTONOMOUS ROAD VEHICLE STEERING SYSTEMS

(71) Applicant: VOLVO CAR CORPORATION, Gothenburg (SE)

(72) Inventors: Nenad Lazic, Gothenburg (SE); Diomidis Katzourakis, Gothenburg (SE); Claes Olsson, Molnlycke (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/924,825

(22) Filed: Oct. 28, 2015

(65) Prior Publication Data
US 2016/0121925 A1    May 5, 2016

(30) Foreign Application Priority Data

Nov. 4, 2014   (EP) .................................. 14191589

(51) Int. Cl.
*B62D 6/10*   (2006.01)
*B62D 15/02*  (2006.01)
*B62D 6/00*   (2006.01)

(52) U.S. Cl.
CPC ............... *B62D 6/10* (2013.01); *B62D 15/025* (2013.01)

(58) Field of Classification Search
CPC .......... G03G 15/0891; B62D 6/10; B62D 6/00
USPC ..................................... 701/41, 42
See application file for complete search history.

(56) References Cited

U.S. PATENT DOCUMENTS

| | | | |
|---|---|---|---|
| 6,134,491 | A | 10/2000 | Kawagoe et al. |
| 6,212,453 | B1 | 4/2001 | Kawagoe et al. |
| 7,044,046 | B2 | 5/2006 | Wietzel et al. |
| 7,177,745 | B2 | 2/2007 | Tsuchiya |

(Continued)

FOREIGN PATENT DOCUMENTS

| | | |
|---|---|---|
| CN | 1491169 A | 4/2004 |
| CN | 101734278 A | 6/2010 |

(Continued)

OTHER PUBLICATIONS

Extended European Search Report Dated May 12, 2015, Application No. 14191589.2-1755, Applicant Volvo Car Corporation, 8 Pages.
Extended European Search Report Dated May 31, 2012, Application No. 11188765.9-1264, Applicant Volvo Car Corporation, 6 Pages.
Chinese Office Action Dated Jun. 1, 2015, Application No. 201210447705.9, Applicant Volvo Car Corporation, 10 Pages.

*Primary Examiner* — Tan Q Nguyen
(74) *Attorney, Agent, or Firm* — Brooks Kushman P.C.

(57) ABSTRACT

A method is provided for intelligent scaling of torque overlay intervention for a semi-autonomous steering system in a road vehicle having a semi-autonomous steering function arranged to selectively apply a steering wheel overlay torque. If decided that a driver is significantly overriding an intervention, the overlay torque is scaled by a scaling factor being a function of applied steering wheel torque. If decided that the driver has been significantly overriding the intervention for more than a pre-determined first time period, the scaling factor is set to its lowest possible value for a specific driving situation. If decided that the driver has been significantly overriding the intervention for more than a pre-determined second time period, where the pre-determined second time period is equal to or exceeds the pre-determined first time period, the scaling factor is faded-out.

15 Claims, 10 Drawing Sheets

(56) References Cited

U.S. PATENT DOCUMENTS

| | | |
|---|---|---|
| 7,711,464 B2 | 5/2010 | Kaufmann |
| 7,835,836 B2 | 11/2010 | Bolourchi et al. |
| 8,849,516 B2 | 9/2014 | Lazic et al. |
| 2006/0217860 A1 | 9/2006 | Ihara |
| 2008/0109134 A1 | 5/2008 | Bolourchi et al. |
| 2008/0189012 A1 | 8/2008 | Kaufmann |
| 2010/0004821 A1 | 1/2010 | Buerkle et al. |
| 2010/0152952 A1 | 6/2010 | Lee et al. |
| 2011/0118936 A1 | 5/2011 | Hong |
| 2011/0231063 A1 | 9/2011 | Kim |
| 2015/0158524 A1* | 6/2015 | Lee ................ B62D 15/025 701/41 |
| 2015/0158528 A1* | 6/2015 | Moshchuk ......... B62D 15/0265 701/41 |

FOREIGN PATENT DOCUMENTS

| | | |
|---|---|---|
| CN | 102069801 A | 5/2011 |
| DE | 19943410 A1 | 5/2000 |
| DE | 102005004726 A1 | 8/2006 |
| DE | 102007058078 A1 | 6/2009 |
| DE | 102008007186 A1 | 8/2009 |
| EP | 1184254 A2 | 3/2002 |
| EP | 2248710 A1 | 11/2010 |
| EP | 2591983 A1 | 5/2013 |
| FR | 2861045 A1 | 4/2005 |
| WO | 2005063546 A1 | 7/2005 |

* cited by examiner

METHOD AND SYSTEM FOR INTELLIGENT SCALING OF TORQUE OVERLAY INTERVENTION FOR SEMI-AUTONOMOUS ROAD VEHICLE STEERING SYSTEMS

CROSS-REFERENCE TO RELATED APPLICATIONS

This application claims foreign priority benefits under 35 U.S.C. §119(a)-(d) to European patent application number EP 14191589.2, filed Nov. 4, 2014, which is incorporated by reference in its entirety.

TECHNICAL FIELD

The present disclosure relates to a method for intelligent scaling of torque overlay intervention for semi-autonomous steering systems in a road vehicle. The disclosure further relates to a system for adaptation of a steering wheel torque overlay intervention of a lane keeping aid system in a road vehicle. In addition, the disclosure refers to a lane keeping aid system for road vehicles. Still further, the disclosure refers to a road vehicle comprising such a lane keeping aid system for road vehicles. Yet further, the disclosure refers to a road vehicle comprising such a system for adaptation of a steering wheel torque overlay intervention of a lane keeping aid system in a road vehicle.

BACKGROUND

It is known to use power steering in road vehicles, e.g., electrical power assisted steering, commonly abbreviated as EPAS, in a road vehicle such as a car, lorry, bus or truck, wherein an electric motor assists a driver of the road vehicle by adding an assistive torque to e.g., a steering column of the road vehicle.

It is further known to use semi-autonomous steering systems, such as lane keeping aid systems, in order to help a road vehicle driver maintain the road vehicle in a desired lane. For lane keeping aid systems where an EPAS is used, a steering wheel torque overlay, i.e., additional steering wheel torque on top of what would have been obtained by the base assist of the EPAS, is used for lateral position control.

Document EP 2 591 983 A1 discloses a method and a system for adaptation of a steering wheel torque overlay of a lane keeping aid system. The method provides logic to override overlay torque from a semi-autonomous steering function, for instance a lane keeping aid, both in general but also in specific scenarios like driving in curves. Scaling of an overlay torque is applied, using a scaling factor that is a function of driver applied steering wheel torque. In the method of EP 2 591 983 A1 the driver applied steering wheel torque directly influences a calculated scaling factor.

However, there are situations where a driver for some reason and during a significant period of time could choose not to follow steering guidance from a position controller of a semi-autonomous steering function, such as that of EP 2 591 983 A1, and instead continuously try to resist or override the overlay torque applied. The effect of such situations is an interaction between the overlay torque and the torque applied by the driver, potentially causing fluctuations in the calculated scaling factor, and because of that, also clearly noticeable torque artifacts from the semi-autonomous steering system.

SUMMARY

Embodiments herein aim to provide an improved method for intelligent scaling of torque overlay for semi-autonomous steering systems in a road vehicle, eliminating or at least reducing torque artifacts from a semi-autonomous steering system in situations where a driver during a significant period of time chooses not to follow steering guidance from a position controller of a semi-autonomous steering function.

This is provided through a method for Intelligent scaling of torque overlay intervention for a semi-autonomous steering system in a road vehicle having a semi-autonomous steering function arranged to selectively apply a steering wheel overlay torque, comprising the steps of: determining if there is an active intervention from the semi-autonomous steering function, and consequently applied a steering wheel overlay torque; if determined that there is an active intervention, scaling the overlay torque by a scaling factor being a function of an applied steering wheel torque, and deciding if the driver is significantly overriding the intervention and the duration of the overriding; if decided that the driver is significantly overriding the intervention the overlay torque is scaled by a scaling factor being a function of the applied steering wheel torque; if decided that the driver has been significantly overriding the lane keeping aid intervention for more than a pre-determined first time period the scaling factor is set to its lowest possible value for the specific driving situation; if decided that the driver has been significantly overriding the lane keeping aid intervention for more than a pre-determined second time period, where the pre-determined second time period is equal to or exceeds the pre-determined first time period the scaling factor is faded-out.

According to a second aspect is provided that the method further comprises the step of measuring the magnitude of a torsion bar torque of the road vehicle steering system, where the decision whether the driver is significantly overriding the intervention is derived from the measured magnitude of the torsion bar torque.

The provision of determining if the driver is significantly overriding the intervention from the measured magnitude of the torsion bar torque provides a simple and reliable determination mechanism.

According to a third aspect is provided that the step of setting the scaling factor to its lowest possible value for the specific driving situation is adapted to one of an inner curve driving situation, an outer curve driving situation, a straight road driving situation.

The provision of setting the scaling factor to its lowest possible value for the specific driving situation facilitates driver override and further enhances the reduction of torque artifacts from the semi-autonomous steering system.

According to a fourth aspect is provided that the step of fading-out the scaling factor comprises fading-out the scaling factor completely.

The provision of fading-out the scaling factor completely provides for no overlay torque from the semi-autonomous steering function in case of continued override by the road vehicle driver.

According to a fifth aspect is provided that if decided that the driver is not significantly overriding the intervention a renewed determination if the driver is significantly overriding the intervention from the semi-autonomous steering function is performed.

The provision of a renewed determination if the driver is significantly overriding the intervention from the semi-autonomous steering function enables a continuous application of the method.

According to a sixth aspect is provided that if determined that intervention from the semi-autonomous steering function is not active and no steering wheel overlay torque is applied a renewed determination if there is an active intervention from the semi-autonomous steering function is performed.

The provision of a renewed determination if there is an active intervention from the semi-autonomous steering function, also in this case, enables a continuous application of the method.

According to a seventh aspect is provided a system for adaptation of a steering wheel torque overlay intervention of a lane keeping aid system in a road vehicle, comprising: an input for receiving a controller torque overlay from a controller of the lane keeping aid system; a steering wheel torque measuring arrangement for measuring the steering wheel torque applied by a driver of the road vehicle on a steering wheel thereof; a scaling factor determining arrangement for determining a scaling factor as a function of the applied steering wheel torque; a corrective steering wheel torque overlay determining arrangement for determining a corrective steering wheel torque overlay based on the controller torque overlay multiplied by the scaling factor; which further comprises: a deciding and setting arrangement for deciding if a driver of the road vehicle has been significantly overriding the lane keeping aid intervention for more than a pre-determined first time period and if so setting the scaling factor to its lowest possible value for a specific driving situation; the deciding and setting arrangement further being arranged to decide if the driver of the road vehicle has been significantly overriding the lane keeping aid intervention for more than a pre-determined second time period, where the pre-determined second time period is equal to or exceeds the pre-determined first time period and if so fade-out the scaling factor.

The provision of a system for adaptation of a steering wheel torque overlay intervention of a lane keeping aid system in a road vehicle as above provides for eliminating or at least reducing torque artifacts from a semi-autonomous steering system in situations where a driver during a significant period of time chooses not to follow steering guidance from a position controller of a semi-autonomous steering function.

According to an eight aspect is provided that the system further comprises an arrangement for measuring the magnitude of a torsion bar torque of the road vehicle steering system, and the deciding and setting arrangement further being arranged to derive whether the driver is significantly overriding the intervention from the measured magnitude of the torsion bar torque.

The provision of determining if the driver is significantly overriding the intervention from the measured magnitude of the torsion bar torque provides a simple and reliable determination mechanism.

According to a ninth aspect is provided that the deciding and setting arrangement is arranged to set the scaling factor to its lowest possible value for one of an inner curve driving situation, an outer curve driving situation, a straight road driving situation if decided that the driver of the road vehicle has been significantly overriding the lane keeping aid intervention for more than the pre-determined first time period.

The provision of setting the scaling factor to its lowest possible value for the specific driving situation facilitates driver override and further enhances the reduction of torque artifacts from the semi-autonomous steering system.

According to a tenth aspect is provided that the deciding and setting arrangement is arranged to fade-out the scaling factor completely if decided that the driver of the road vehicle has been significantly overriding the lane keeping aid intervention for more than the pre-determined second time period.

The provision of fading-out the scaling factor completely provides for no overlay torque from the semi-autonomous steering function in case of continued override by the road vehicle driver.

According to an eleventh aspect is provided that the deciding and setting arrangement, if decided that the driver is not significantly overriding the intervention, is arranged to perform a renewed determination if the driver is significantly overriding the intervention from the semi-autonomous steering function.

The provision of a renewed determination if the driver is significantly overriding the intervention from the semi-autonomous steering function enables a continuous operation of the system.

According to an twelfth aspect is provided that the deciding and setting arrangement, if determined that intervention from the semi-autonomous steering function is not active and no steering wheel overlay torque is applied, is arranged to perform a renewed determination if there is an active intervention from the semi-autonomous steering function.

The provision of a renewed determination if there is an active intervention from the semi-autonomous steering function, also in this case, enables a continuous operation of the system.

According to an thirteenth aspect is provided a lane keeping aid system for road vehicles that comprises a system for adaptation of a steering wheel torque overlay intervention of a lane keeping aid system in a road vehicle, as above.

The provision of a lane keeping aid system for road vehicles that comprises a system as above provides for eliminating or at least reducing torque artifacts from a semi-autonomous steering system in situations where a driver during a significant period of time chooses not to follow steering guidance from a position controller of a semi-autonomous steering function.

According to an fourteenth aspect is provided a road vehicle that comprises a lane keeping aid system for road vehicles as above.

The provision of a road vehicle that comprises a lane keeping aid system as above provides for eliminating or at least reducing torque artifacts from a semi-autonomous steering system in situations where a driver during a significant period of time chooses not to follow steering guidance from a position controller of a semi-autonomous steering function.

According to a final aspect is provided a road vehicle that it comprises a system for adaptation of a steering wheel torque overlay intervention of a lane keeping aid system in a road vehicle, as above.

A vehicle that comprises a system as above provides for eliminating or at least reducing torque artifacts from a semi-autonomous steering system in situations where a driver during a significant period of time chooses not to follow steering guidance from a position controller of a semi-autonomous steering function.

BRIEF DESCRIPTION OF THE DRAWINGS

In the following, embodiments will be described in greater detail by way of example only with reference to the attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
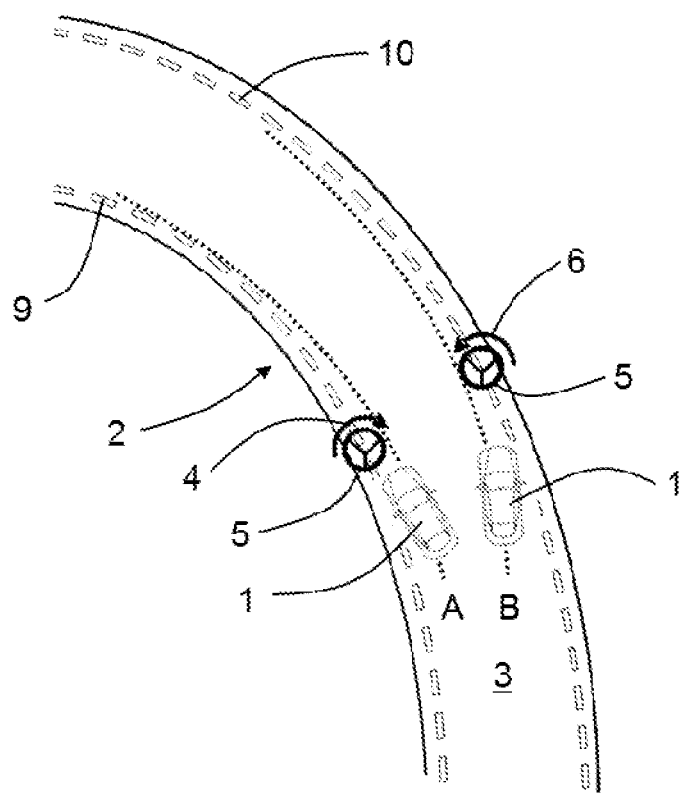
FIG. 1 is a schematic illustration of a semi-autonomous steering system providing temporary steering guidance to help a road vehicle driver stay in a lane travelled.

Semi-Autonomous Steering Systems, such as lane keeping aid systems may, as illustrated in FIG. 1, provide temporary steering guidance to help a road vehicle 1 driver maintain the road vehicle 1 in a desired lane. The term Semi-Autonomous Steering is herein used to describe autonomous lateral road vehicle control with driver steering interaction.

FIG. 1 schematically illustrates the principles of lane keeping aid interventions in a curve 2. A road vehicle 1 is driven by a driver in a lane 3 and comprises a lane keeping aid system. The lane keeping aid system may assist the driver to keep the vehicle 1 in the center of the lane 3. When being on an inner side of the lane 3 in a curve 2, as in position A of FIG. 1, the lane keeping aid system will assist to steer the vehicle 1 towards the center of the lane 3, i.e., against the lane curvature, in FIG. 1 illustrated by applying a torque, see arrow 4, to the steering wheel 5. This additional torque applied by the lane keeping aid system is called steering wheel overlay torque, hereafter designated $T_c$.

When being on an outer side of the lane 3 in a curve 2, as in position B of FIG. 1, the lane keeping aid system will assist to steer the vehicle 1 towards the center of the lane 3, i.e., along the lane curvature, in FIG. 1 illustrated by applying a torque, see arrow 6 to the steering wheel 5. The general principles of such a lane keeping aid system are known by the skilled person and will not be explained in any further detail, except for the details differentiating the lane keeping aid system of the disclosure from that of the state of the art.

Figure 2:
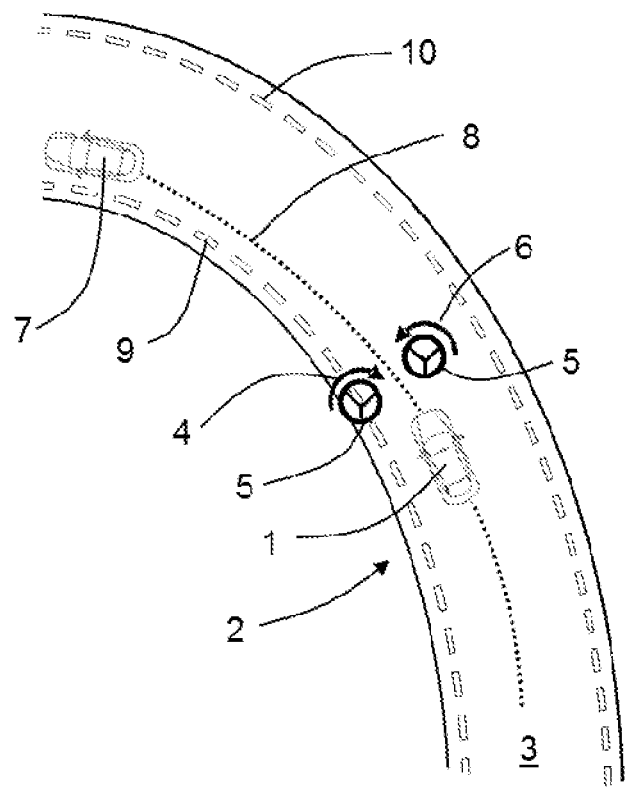
FIG. 2 is a schematic illustration of a semi-autonomous steering system providing continuous steering guidance to help a road vehicle driver to follow another vehicle in the lane travelled.

Semi-Autonomous Steering Systems, such as lane keeping aid systems, may also, as illustrated in FIG. 2, provide continuous steering guidance, e.g., help the road vehicle driver to follow another vehicle 7.

FIG. 2 schematically illustrates the principles of lane keeping aid interventions to follow another vehicle 7. The road vehicle 1 is also in this case thus driven by a driver in a lane 3 and comprises a lane keeping aid system. The lane keeping aid system may assist the driver to assist the vehicle 1 in following the course, illustrated by the dotted line 8, of the preceding vehicle 7. When deviating to an inner side of the course 8 in a curve 2 the lane keeping aid system will assist to steer the vehicle 1 towards the center of the course 8, in FIG. 2 illustrated by applying a torque, see arrow 4, to the steering wheel 5. This additional torque applied by the lane keeping aid system is, as above, called steering wheel overlay torque $T_c$. When deviating to an outer side of the course 8 in a curve 2 the lane keeping aid system will assist to steer the vehicle 1 towards the center of the course 8, in FIG. 2 illustrated by applying a torque, see arrow 6 to the steering wheel 5.

Acceptable driver interaction is crucial in order to obtain a comfortable steering feel under all conditions where a lane keeping aid function intervenes. This includes situations like driving in curves, entering/exiting/cutting curves or in any other way overriding the intervention.

Figure 3:
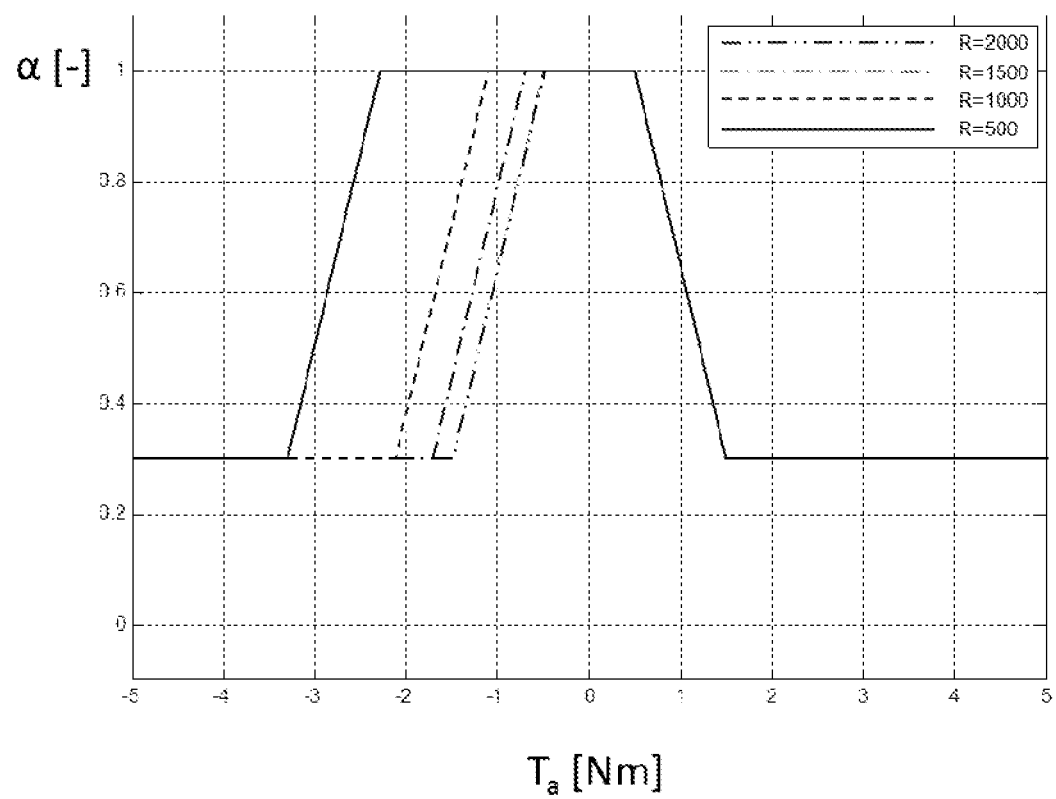
FIG. 3 is an example plot of a prior-art approach to calculate scaling factors in order to scale down an overlay torque when driver counter-steers, for intervention at an outer side of a lane or straight road, in curves with different radii.

FIG. 3 is an example plot of a prior-art approach to calculate scaling factors a in order to scale down an overlay torque $T_c$ when a road vehicle driver counter-steers, for intervention at an outer side of a lane 3 or straight road (corresponding to an infinite curve radius), in road curves 2 with different radii. The break points of the scaling factor α curves can be tunable, for each road curve 2 radius separately.

When the direction of intervention has the state of "outer side", the scaling curve may look like in FIG. 3. FIG. 3 illustrates a set of scaling curves used for "outer side" and corresponding to different road curves 2 expressed in meters [m]. As can be derived from FIG. 3, road curves 2 having a radius above 2000 m are treated as the state "straight forward". When the road curve 2 gets sharper, i.e., the radius decreases, the scaling curve is displaced to the left in FIG. 3, i.e., against higher absolute values of the applied steering wheel torque $T_a$. The magnitude is maintained, when the scaling curve is displaced to the left in FIG. 3. The center of a dead zone of the scaling curve then moves to the left. This corresponds to that of applying a certain torque to the steering wheel 5 in order to follow the curvature of the lane 3. The sharper the road curve 2 is the higher is the absolute value of the torque used for following the curvature of the lane 3.

In FIG. 3 it is illustrated to select a certain scaling curve dependent on road curve 2 radius. As an alternative, or in combination, other vehicle 1 and road parameters may be used to select a certain scaling curve, such as vehicle 1 speed, yaw rate and/or lateral acceleration.

In FIG. 3 only half of the scaling curve is changed, in the illustrated case the left-hand half. However, whether it is the left-hand or right-hand half of the scaling curve being changed depends on the principle used for determining the sign for the curve 2 of the lane 3. In general terms, which half of the scaling curve being changed corresponds to the direction in which the curve 2 of the lane 3 bends, i.e., the torque needed to follow the curve 2 of the lane 3.

Figure 4:
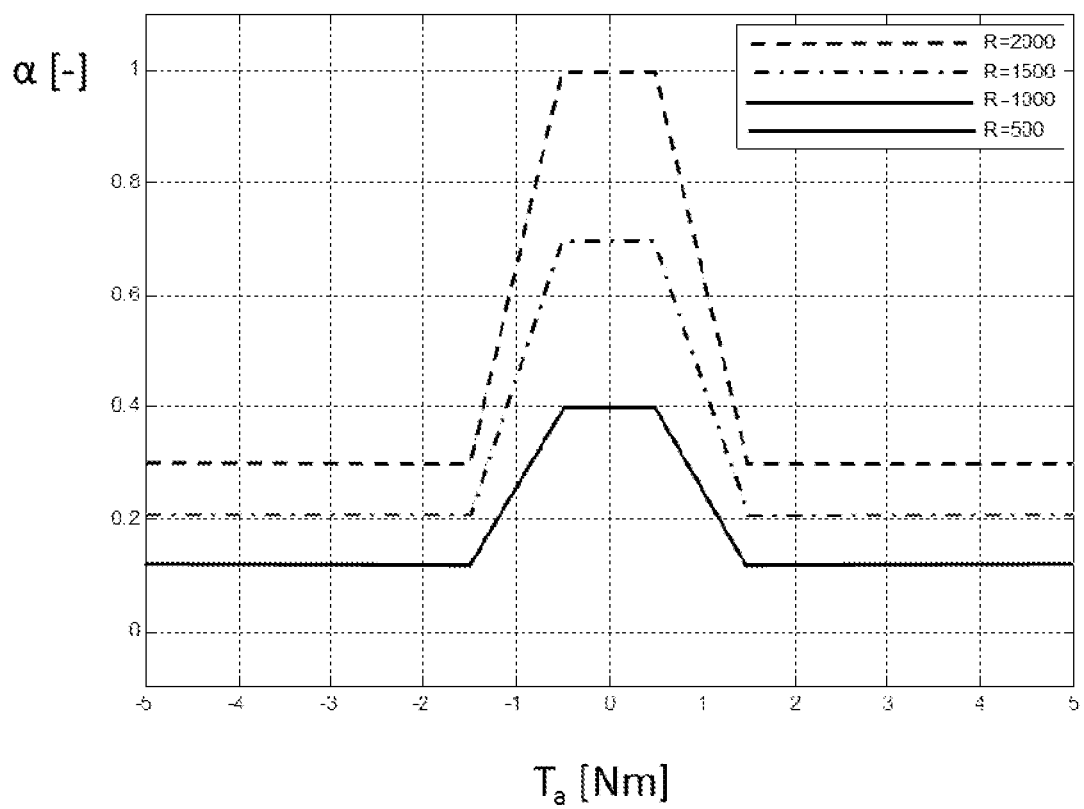
FIG. 4 is an example plot of a prior-art approach to calculate scaling factors in order to scale down overlay torque when driver counter-steers, for intervention at inner side of a lane, in curves with different radii.

FIG. 4 is an example plot of a prior-art approach to calculate scaling factors a in order to scale down overlay torque $T_c$ when a road vehicle 1 driver counter-steers, for intervention at an inner side of a lane 3, in road curves 2 with different radii. The break points can be tunable, for each road curve 2 radius separately.

Thus, if instead the direction of intervention has the state of "inner side", the scaling curve may look like in FIG. 4.

FIG. 4 illustrates a set of scaling curves used for "inner side" and corresponding to different road curve 2 radii expressed in meters. As can be derived from FIG. 4, road curves 2 having a radius above 2000 m are treated as the state "straight forward". When the road curve 2 gets sharper, i.e., the radius decreases, the magnitude of the scaling curve is reduced, however the position around zero applied steering wheel torque $T_a$ is maintained. The center of a dead zone of the scaling curve therefore remains the same. The sharper the road curve 2 is, the lower the scaling curve. FIG. 4 further illustrates that the scaling curves for the respective radii of 1000 m and 500 m coincide.

As for FIG. 3, FIG. 4 illustrates selecting a certain scaling curve dependent on road curve 2 radius. As an alternative, or in combination, other vehicle 1 and/or road parameters may be used for selecting the scaling curve, such as vehicle 1 speed, yaw rate and/or lateral acceleration.

The states for the direction of intervention may for example be selected according to "Straight forward": curve radius>X m. "Inner side": curve radius≤X m and (lane keep assist intervention when approaching a left side lane marker 9, when a lane 3 is turning to the left OR lane keep assist intervention when approaching right side lane marker 10, when a lane 3 is turning to the right).

"Outer side": curve radius≤X m and (lane keep assist intervention when approaching a left side lane marker 9, when a lane 3 is turning to the right OR lane keep assist intervention when approaching a right side lane marker 10, when a lane 3 is turning to the left).

In FIGS. 3 and 4, the curve radius for transfer between the states, X, is illustrated as being 2000 m. However, the value of X for transfer between the states is selectable. It may for example be between 1000 m and 10000 m, preferably between 1500 m and 5000 m.

Figure 5:
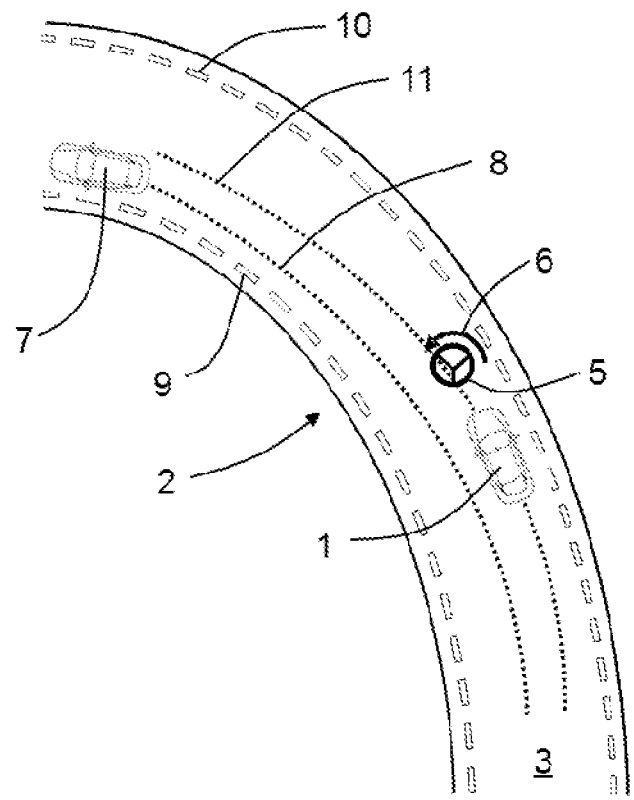
FIG. 5 is a schematic illustration of a situation where the overlay torque is overridden during a longer time period.

There are situations where a road vehicle driver for some reason and during a significant period of time could choose not to follow steering guidance from a position controller of a semi-autonomous steering function of the road vehicle 1, and instead, as illustrated in FIG. 5, continuously try to resist or override an overlay torque $T_c$ applied thereby.

FIG. 5 illustrates that instead of allowing the lane keeping aid system to assist the driver to assist the vehicle 1 in following the course 8 of a preceding vehicle 7, the driver continuously resist or override the overlay torque $T_c$ applied by the lane keeping aid system, thus following an alternative course, illustrated by the dotted line 11.

Figure 6:
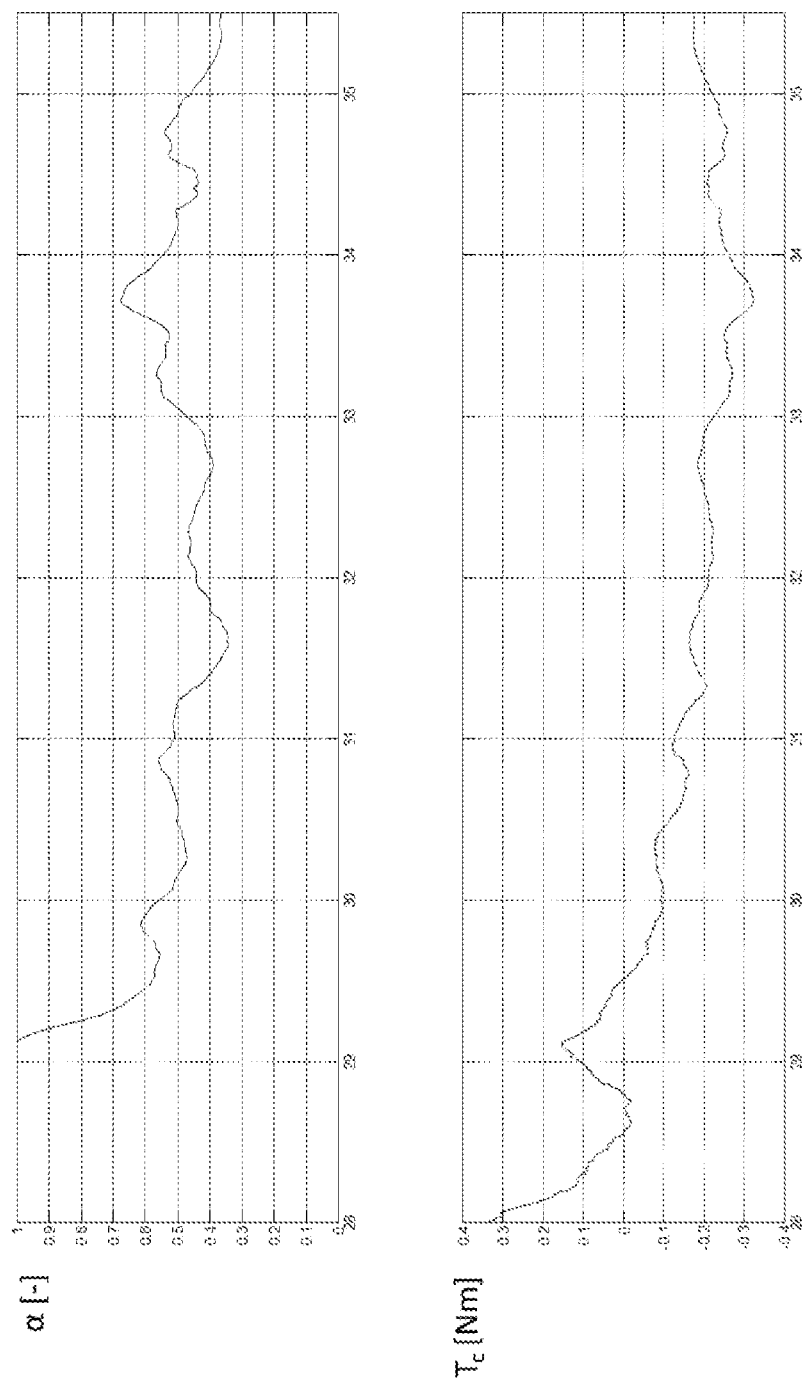
FIG. 6 is a schematic illustration of example scaling factor and overlay torque when driver resists steering guidance from a semi-autonomous steering function.

The effect of such situations is an interaction between the overlay torque $T_c$ and the torque applied by the driver $T_a$, potentially causing fluctuations in a calculated scaling factor α, and because of that, also clearly noticeable torque artifacts from the semi-autonomous steering system, as illustrated in FIG. 6.

In order to inhibit potential torque artifacts in case the road vehicle 1 driver continuously resists the overlay torque $T_c$ during a significant time period, in accordance with the method proposed herein, the scaling factor α can be reduced to, and kept on, a minimum level defined for the specific situation, e.g., inner/outer curve, straight road etc.

In case of continued resistance by the road vehicle 1 driver, the scaling factor α can be faded-out, preferably completely, resulting in no overlay torque $T_c$ from the semi-autonomous steering function.

Figure 7:
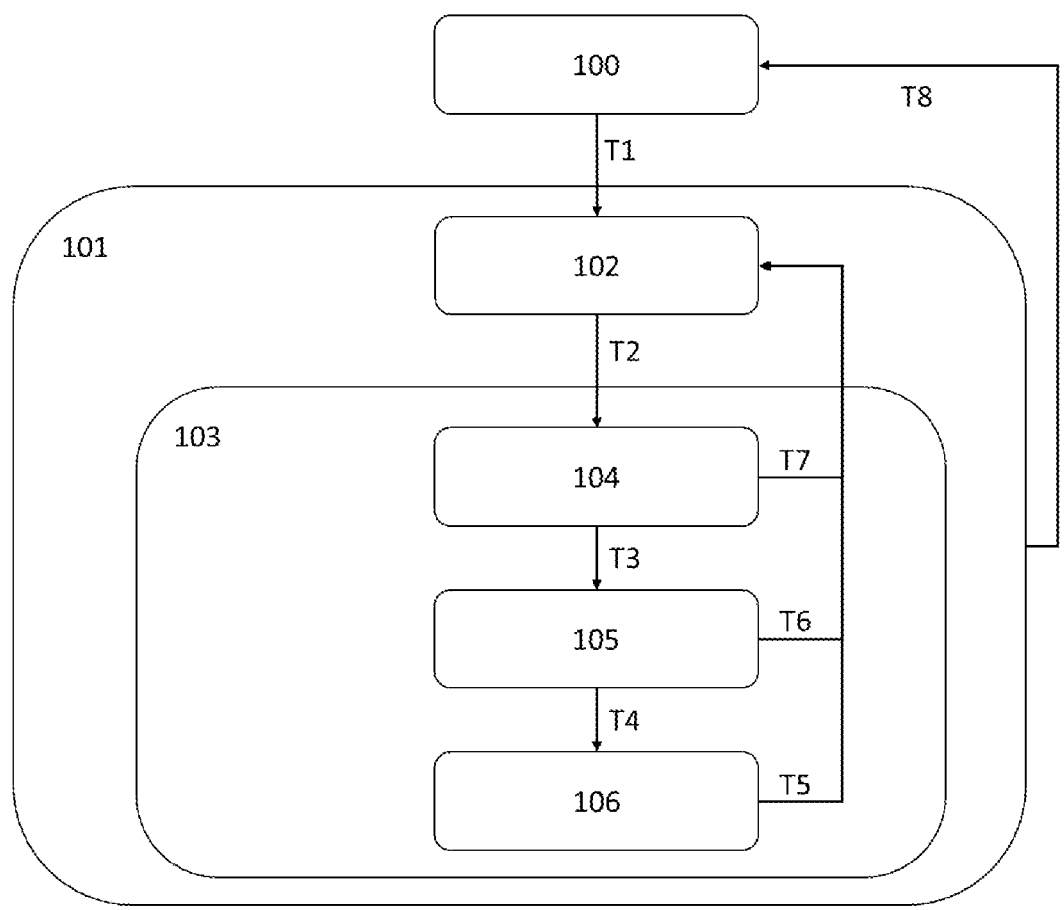
FIG. 7 is a schematic flow chart of the proposed method compensating for the overlay torque artifacts.

The method for reducing the aforementioned undesired effect of the overlay torque $T_c$ artifacts is illustrated in FIG. 7, and described below.

The states of the method are defined as follows:

"100 No Intervention":

There is no intervention from the semi-autonomous steering function, and consequently no steering wheel 5 overlay torque $T_c$ applied.

"101 Intervention":

There is an active intervention from the semi-autonomous steering function, and consequently applied steering wheel 5 overlay torque $T_c$.

"102 Driver not Significantly Overriding Intervention AND Normal Scaling":

The driver is not considered to be significantly overriding the intervention, but instead complies with the guidance provided by the overlay torque $T_c$. Thus, a certain degree of scaling is applicable also when some level of override might occur, but below the level defined in the following as "significantly overriding".

The overlay torque $T_c$ is scaled according to some prior-art method, e.g., according to the method disclosed in EP 2 591 983 A1, as a function of the applied steering wheel torque. The method disclosed in prior-art document EP 2 591 983 A1 is hereby incorporated by reference in its entirety in the present disclosure.

"103 Driver Significantly Overriding Intervention":

The driver is considered to be significantly overriding the intervention, resisting the guidance provided by the overlay torque $T_c$.

The decision whether the driver complies or resists the intervention derives from a magnitude of a measured torsion bar torque, see transitions T2 and T5/T6/T7 below.

"104 Normal Scaling":

The driver is overriding the intervention and the overlay torque $T_c$ is scaled according to some prior-art method, e.g., according to the method disclosed in EP2591983 A1, as a function of the applied steering wheel torque.

"105 Constant Scale Factor":

The driver is overriding the intervention and the scaling factor α is set to its lowest possible value in the specific situation (inner/outer curve, straight road). The value corresponds to the x-values of break points BP1 or BP5, depending on the situation, see FIG. 8.

Figure 8:
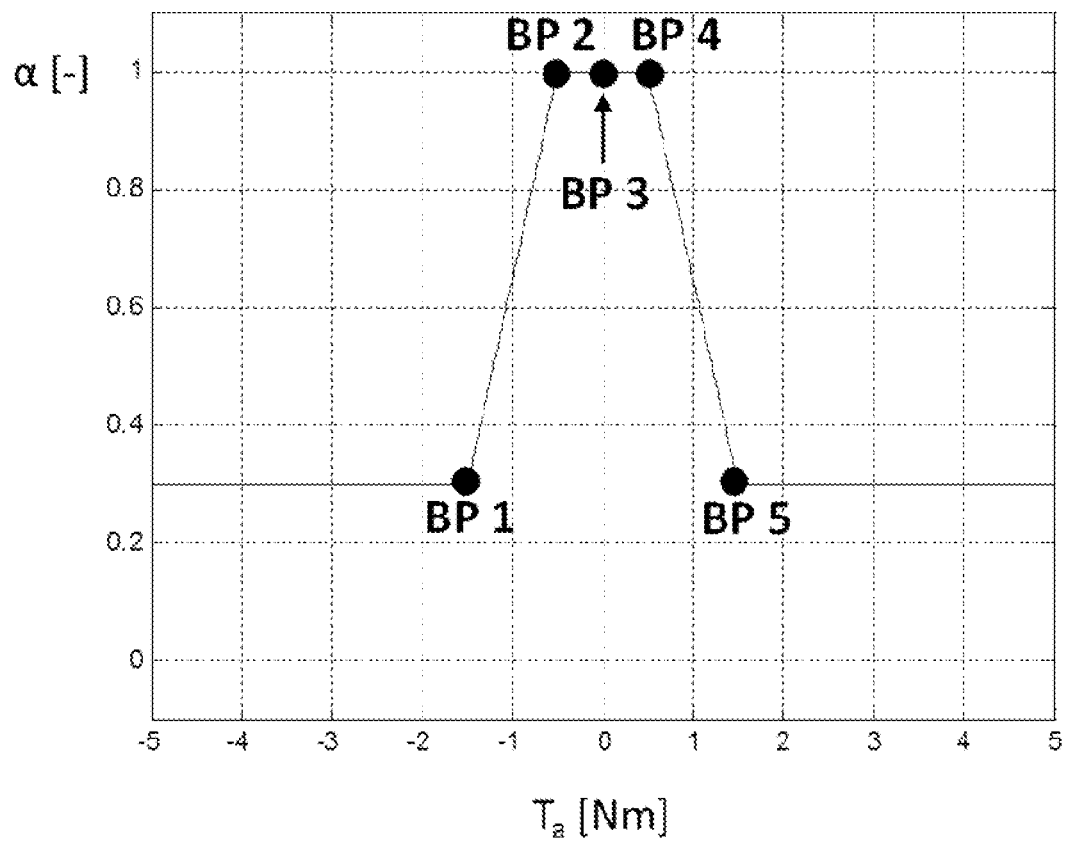
FIG. 8 is a schematic illustration of scaling factor as function of driver applied steering wheel torque, including some defined break points.

FIG. 8 illustrates the scaling factor α as function of driver applied steering wheel torque $T_a$, including some defined break points BP1-BP5.

Thus, a scaling curve showing the scaling factor α as a function of the applied steering wheel torque $T_a$ is illustrated in FIG. 8. As can be seen, the scaling curve comprises a dead zone centered on a selectable value of the applied steering wheel torque $T_a$, in this case zero.

The value of zero corresponds to no applied torque, e.g., the driver not gripping the steering wheel 5. The selectable value of the applied steering wheel torque $T_a$ is defined as the midpoint of the dead zone. A scaling factor one, α=1, as in the dead zone, means that a controller steering wheel torque overlay $T_r$ is used as corrective steering wheel torque overlay $T_c$. Outside the dead zone the scaling factor α is less than one, α<1, it thus scales down the controller steering wheel torque overlay $T_r$; such that $T_c = \alpha \times T_r$.

The scaling curve of FIG. 8 comprises at least one primary break point BP2, BP4 corresponding to a value $T_p$ of the applied steering wheel torque $T_a$. In the illustrated embodiment the scaling curve is symmetric around zero and there are two primary break points BP2, BP4.

The primary break points BP2, BP4 delimit the dead zone. The scaling curve further comprises at least one secondary break point BP1, BP5 corresponding to a value $T_s$ of the applied steering wheel torque $T_a$. The absolute value of $T_s$ is greater than that of $T_p$. In the illustrated embodiment the scaling curve is symmetric around zero and there are two secondary break points BP1, BP5. The scaling curve is arranged such that the scaling factor α decreases between the primary break point BP2, BP4 and the secondary break point BP1, BP5 at either side of the center BP3. Even if FIG. 8 shows a linear decrease, the scaling curve is not restricted to a particular shape.

The scaling curve, as in FIG. 8, may have a variety of shapes, but is preferably symmetric. The scaling curve could also be expressed as an analytical function or as a look-up table. The position/s of the primary BP2, BP4 and/or secondary break point/s BP1, BP5 may be parameterized as a function of one or more vehicle 1 and/or road parameters, such as vehicle 1 speed, yaw rate and/or lateral acceleration.

If only one scaling curve is used, as the scaling curve disclosed in FIG. 8, road curve 2 driving will not be handled in any specific way. The steering wheel torque overlay $T_c$ will then be scaled down in the same way regardless whether the intervention occurs on a straight road, the inner side of a lane or the outer side of a lane.

Therefore, in further embodiments, it is envisaged that a set of scaling curves is used, the actual scaling curve being selected based on a direction of intervention, as described for FIGS. 3 and 4. The direction of intervention may have a state comprising at least one of "inner side", "straight forward" and "outer side".

Preferably, the "straight forward" state uses a scaling curve which is symmetric and centered on zero, for example as the one illustrated in FIG. 8.

Thus, left of center in FIG. 8 a negative torque is scaled for keeping the road curvature, cutting a road curve 2 or overriding an intervention on the inside of a road curve 2. Correspondingly, right of center in FIG. 8 a positive torque is scaled for overriding an intervention on the outside of a road curve 2 or overriding an intervention on a straight road. "106 Fade-Out Scale Factor":

The driver is overriding the intervention and the scale factor α is faded-out, preferably completely, i.e., to zero. The fade-out can be a linear decrease, as a function of time, of the scaling factor α from the "Constant scale factor" state. See FIG. 9.

The transitions T1-T8 of the method are defined as follows:

T1: Lane keeping aid intervention is active and overlay torque $T_c$ for lateral position control of the road vehicle 1 is applied.

T2: Driver is significantly overriding the lane keeping aid intervention.

The criteria for significant override (transition T2) according to the method described herein are defined as:

Driver applied steering wheel torque
$T_a$>BP4 x-value+(BP5 x-value−BP4 x-value)×K or Driver applied steering wheel torque
$T_a$<BP2 x-value−(BP2 x-value−BP1 x-value)×K Where K∈[0 . . . 1].

Driver applied steering wheel torque $T_a$ may e.g., be derived through measuring the magnitude of a torsion bar torque of the road vehicle 1 steering system.

T3: Driver has been significantly overriding the lane keeping aid intervention for more than a pre-determined first time period, $t_a$ seconds.

T4: Driver has been significantly overriding the lane keeping aid intervention for more than a pre-determined second time period, $t_b$ seconds, where $t_b \geq t_a$.

T5/T6/T7: Driver is not significantly overriding the lane keeping aid intervention anymore.

The thresholds of the "not significantly overriding" criteria are the same as for the "significantly overriding" criteria (see T2) but with a hysteresis, in terms of time and/or driver applied steering wheel torque $T_a$.

For some specific situations or features, the transitions T5 and/or T6 could be inhibited or excluded.

T8: Lane keeping aid intervention is not active and no overlay torque $T_c$ for lateral position control of the road vehicle 1 is applied.

Figure 9:
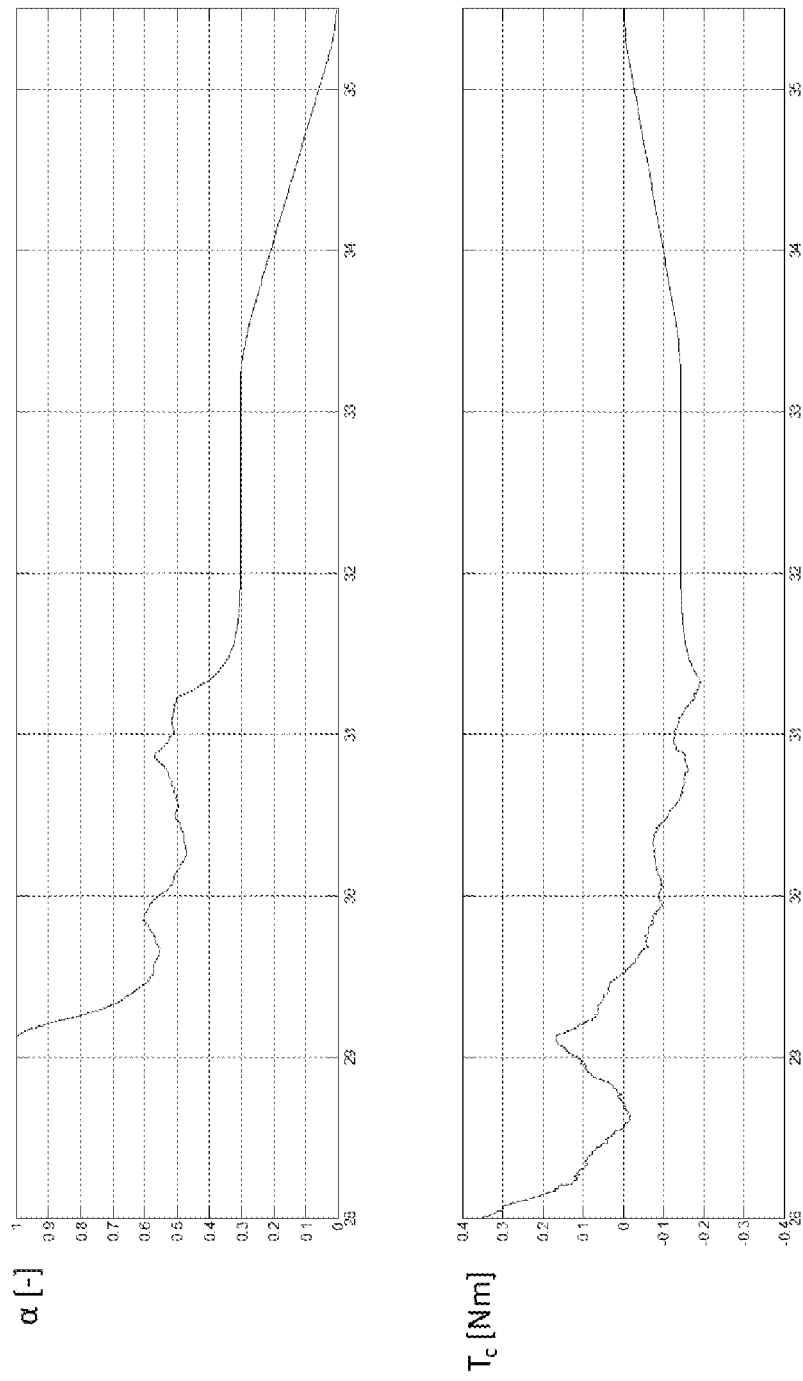
FIG. 9 is a schematic illustration of example scaling factor and overlay torque when the disclosed method is applied.

FIG. 9 shows the scaling factor α and overlay torque $T_c$ for the same situation as in FIG. 6, but in this case illustrating the effects on the scaling factor α and overlay torque $T_c$ when the disclosed method is applied. FIG. 9 shows an example of scaling factor α and overlay torque $T_c$ when the disclosed method is applied, with K=0.1, $t_a$=2 sec, $t_b$=4 sec.

In the following the proposed method will be described in more detail.

The method for Intelligent scaling of torque overlay intervention for a semi-autonomous steering system in a road vehicle 1 having a semi-autonomous steering function arranged to selectively apply a steering wheel overlay torque $T_c$, comprises the steps of: determining if there is an active intervention from the semi-autonomous steering function, and consequently applied a steering wheel overlay torque $T_c$, 100, 101, T1;

if determined that there is an active intervention, scaling the overlay torque $T_c$ by a scaling factor α being a function of an applied steering wheel torque $T_a$, and deciding if the driver is significantly overriding the intervention and the duration of the overriding 102, T2;

if decided that the driver is significantly overriding the intervention the overlay torque $T_c$ is scaled by a scaling factor α being a function of the applied steering wheel torque $T_a$, 104;

if decided that the driver has been significantly overriding the lane keeping aid intervention for more than a pre-determined first time period $t_a$ the scaling factor α is set to its lowest possible value for the specific driving situation T3, 105;

if decided that the driver has been significantly overriding the lane keeping aid intervention for more than a pre-determined second time period $t_b$, where the pre-determined second time period $t_b$ is equal to or exceeds $t_b \geq t_a$ the pre-determined first time period $t_a$ the scaling factor $\alpha$ is faded-out T4, 106.

In some embodiments hereof the method further comprises the step of measuring the magnitude of a torsion bar torque of the road vehicle steering system, where the decision whether the driver is significantly overriding the intervention is derived from the measured magnitude of the torsion bar torque.

For improved adaptation to different driving situations, in some embodiments the step of setting the scaling factor $\alpha$ to its lowest possible value for the specific driving situation is adapted to one of an inner curve driving situation, an outer curve driving situation, a straight road driving situation.

For eliminating the overlay torque $T_c$ in case of continuous driver override, in some embodiments the step of fading-out the scaling factor $\alpha$ comprises fading-out the scaling factor $\alpha$ completely.

In order to ensure continuous applicability of the method, in some embodiments, if decided that the driver is not significantly overriding the intervention, a renewed determination if the driver is significantly overriding the intervention from the semi-autonomous steering function is performed.

In order to ensure continuous applicability of the method, in yet some embodiments, if determined that intervention from the semi-autonomous steering function is not active and no steering wheel overlay torque $T_c$ is applied, a renewed determination if there is an active intervention from the semi-autonomous steering function is performed T8, 100.

Figure 10:
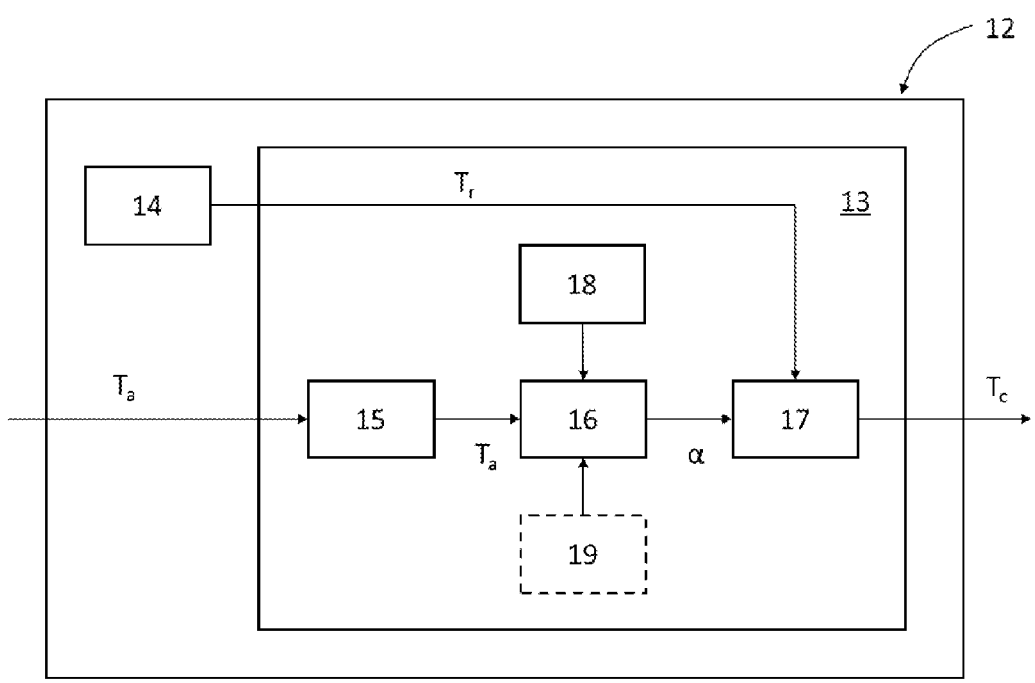
FIG. 10 is a schematic illustration of an example system for adaptation of a steering wheel torque overlay intervention.

FIG. 10 schematically illustrates an example lane keeping aid system 12 comprising a system 13 for adaptation of the steering wheel torque overlay $T_c$ of the lane keeping aid system 12 in a road vehicle 1 and a controller 14.

The controller 14 is the controller used in the lane keeping aid system 12, i.e., a lane 3 position controller. The controller 14 may be adapted to control the steering angle of the road vehicle 1. The controller 14 is adapted to provide a controller torque overlay $T_r$ to be used as input for the system 13 for adaptation of the steering wheel torque overlay $T_c$.

The system 13 for adaptation of the steering wheel torque overlay $T_c$ comprises a steering wheel torque $T_a$ measuring arrangement 15 for measuring a steering wheel torque $T_a$ applied by a driver of the road vehicle 1 on a steering wheel 5 thereof, a scaling factor $\alpha$ determining arrangement 16 for determining a scaling factor $\alpha$ as a function of the applied steering wheel torque $T_a$, and a corrective steering wheel torque overlay $T_c$ determining arrangement 17 for determining a corrective steering wheel torque overlay $T_c$ based on the controller torque overlay $T_r$ multiplied by the scaling factor $\alpha$, and a deciding and setting arrangement 18 for deciding if a driver of the road vehicle 1 has been significantly overriding the lane keeping aid intervention for more than one of the first and second predetermined time periods, $t_a$ and $t_b$, and providing an input to the arrangement 16 for determining the scaling factor $\alpha$ to adapt the scaling factor $\alpha$ in accordance with the above described method.

Optionally, the system for adaptation may further comprise a direction of intervention determining arrangement 19 for determining a direction of intervention.

The direction of intervention has a state comprising at least one of "inner side", "straight forward" and "outer side". The state may be used as input to the arrangement 16 for determining the scaling factor $\alpha$ as a function of the applied steering wheel torque $T_a$, e.g., in accordance with the prior-art method described herein, or a similar method.

Although the present disclosure relates to an adaptation of steering wheel torque overlay intervention using an EPAS system, however, the principles of the present disclosure are independent of the EPAS and may also be used in a vehicle with other systems providing power assisted steering for adapting a steering wheel torque overlay intervention.

In accordance with the present application is also envisaged a lane keeping aid system 12 for road vehicles 1 comprising a system 13 for adaptation of the steering wheel torque overlay $T_c$ as described in the foregoing.

Further, in accordance with the present application is also envisaged a road vehicle 1 comprising a lane keeping aid system 12 for road vehicles 1 as described in the foregoing.

Still further, in accordance with the present application is also envisaged a road vehicle 1 comprising a system 13 for adaptation of the steering wheel torque overlay $T_c$ as described in the foregoing.

As one skilled in the art would understand, the above described systems (e.g., 12, 13), controllers (e.g., 14) and arrangements (e.g., 15, 16, 17, 18, 19) may each include suitable hardware and/or software, such as one or more processors (e.g., one or more microprocessors, microcontrollers and/or programmable digital signal processors) in communication with one or more storage devices or media including computer readable program instructions that are executable by the one or more processors so that the particular system, arrangement, or controller may perform particular algorithms represented by the functions and/or operations described herein. Each system, controller and arrangement may also, or instead, include one or more application specific integrated circuits, programmable gate arrays or programmable array logic, programmable logic devices, or digital signal processors.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A method for scaling of torque overlay intervention for a semi-autonomous steering system in a road vehicle having a semi-autonomous steering function arranged to selectively apply a steering wheel overlay torque, the method comprising:

determining if there is an active intervention from the semi-autonomous steering function, and a consequently applied steering wheel overlay torque;

if determined that there is an active intervention, scaling the overlay torque by a scaling factor being a function of an applied steering wheel torque, and deciding if the driver is significantly overriding the intervention and duration of the overriding;

if decided that the driver is significantly overriding the intervention, scaling the overlay torque by a scaling factor being a function of the applied steering wheel torque;

if decided that the driver has been significantly overriding the intervention for more than a pre-determined first time period, setting the scaling factor to its lowest possible value for a specific driving situation;

if decided that the driver has been significantly overriding the intervention for more than a pre-determined second time period, where the pre-determined second time period is equal to or exceeds the pre-determined first time period, fading-out the scaling factor.

2. The method according to claim 1 further comprising measuring magnitude of a torsion bar torque of the steering system, wherein the decision whether the driver is significantly overriding the intervention is derived from the measured magnitude of the torsion bar torque.

3. The method according to claim 1 wherein setting the scaling factor to its lowest possible value for the specific driving situation is adapted to one of an inner curve driving situation, an outer curve driving situation, or a straight road driving situation.

4. The method according to claim 1 wherein fading-out the scaling factor comprises fading-out the scaling factor completely.

5. The method according to claim 1 wherein if decided that the driver is not significantly overriding the intervention, a renewed determination if the driver is significantly overriding the intervention from the semi-autonomous steering function is performed.

6. The method according to claim 1 wherein if determined that intervention from the semi-autonomous steering function is not active and no steering wheel overlay torque is applied, a renewed determination if there is an active intervention from the semi-autonomous steering function is performed.

7. A system for adaptation of a steering wheel torque overlay intervention of a lane keeping aid system in a road vehicle, the system comprising:

a steering wheel torque measuring arrangement for measuring steering wheel torque applied by a driver of the road vehicle on a steering wheel thereof;

a scaling factor determining arrangement for determining a scaling factor as a function of the applied steering wheel torque;

a corrective steering wheel torque overlay determining arrangement for determining a corrective steering wheel torque overlay based on a controller torque overlay, from a controller of the lane keeping system, multiplied by the scaling factor;

a deciding and setting arrangement for deciding if a driver of the road vehicle has been significantly overriding the lane keeping aid intervention for more than a pre-determined first time period and, if so, setting the scaling factor to its lowest possible value for a specific driving situation;

the deciding and setting arrangement further being configured to decide if the driver of the road vehicle has been significantly overriding the lane keeping aid intervention for more than a pre-determined second time period, wherein the pre-determined second time period is equal to or exceeds the pre-determined first time period, and if so fade-out the scaling factor.

8. The system according to claim 7 further comprising an arrangement for measuring magnitude of a torsion bar torque of a steering system the road vehicle, wherein the deciding and setting arrangement is further configured to derive whether the driver is significantly overriding the intervention from the measured magnitude of the torsion bar torque.

9. The system according to claim 7 wherein the deciding and setting arrangement is configured to set the scaling factor to its lowest possible value for one of an inner curve driving situation, an outer curve driving situation, or a straight road driving situation if decided that the driver of the road vehicle has been significantly overriding the lane keeping aid intervention for more than the pre-determined first time period.

10. The system according to claim 7 wherein the deciding and setting arrangement is configured to fade-out the scaling factor completely if decided that the driver of the road vehicle has been significantly overriding the lane keeping aid intervention for more than the pre-determined second time period.

11. The system according to claim 7 wherein, if decided that the driver is not significantly overriding the lane keeping aid intervention, the deciding and setting arrangement is configured to perform a renewed determination if the driver is significantly overriding the lane keeping aid intervention.

12. The system according to claim 7 wherein, if determined that intervention from a semi-autonomous steering function is not active and no steering wheel overlay torque is applied, the deciding and setting arrangement is configured to perform a renewed determination if there is an active intervention from the semi-autonomous steering function.

13. A lane keeping aid system for a road vehicle comprising the system according to claim 7.

14. A road vehicle comprising the lane keeping aid system according to claim 13.

15. A road vehicle comprising the system according to claim 7.

* * * * *

UNITED STATES PATENT AND TRADEMARK OFFICE
CERTIFICATE OF CORRECTION

PATENT NO. : 9,527,527 B2
APPLICATION NO. : 14/924825
DATED : December 27, 2016
INVENTOR(S) : Nenad Lazic et al.

It is certified that error appears in the above-identified patent and that said Letters Patent is hereby corrected as shown below:

In the Claims

Column 14, Line 18, Claim 8:
After "torque of a steering system"
Insert -- of --.

Signed and Sealed this
Twenty-first Day of March, 2017

Michelle K. Lee
*Director of the United States Patent and Trademark Office*